United States Patent [19]

Kudo et al.

[11] 4,172,394
[45] Oct. 30, 1979

[54] SAFETY DEVICE FOR A MOTOR-CYCLE WITH FLUID COUPLING

[75] Inventors: Masayuki Kudo, Shiki; Nobuo Miura, Wako, both of Japan

[73] Assignee: Honda Giken Kogyo Kabushiki Kaisha, Tokyo, Japan

[21] Appl. No.: 844,789

[22] Filed: Oct. 25, 1977

[30] Foreign Application Priority Data

Oct. 29, 1976 [JP] Japan .................................. 51/131089

[51] Int. Cl.² ............................................. B60K 41/04
[52] U.S. Cl. .................................. 74/850; 123/179 K; 116/DIG. 20
[58] Field of Search ............................. 74/850; 192/3; 180/82 A, 82 R, 33; 123/179 K, 198 CD; 361/193; 116/DIG. 20

[56] References Cited

U.S. PATENT DOCUMENTS

| | | | |
|---|---|---|---|
| 2,303,049 | 11/1942 | Ingalls | 116/DIG. 20 |
| 2,828,642 | 4/1958 | Bernard | 74/850 |
| 3,726,265 | 4/1973 | Howard | 123/179 K |
| 4,033,311 | 7/1977 | Burson | 123/179 K |

Primary Examiner—C. J. Husar
Assistant Examiner—Frank McKenzie
Attorney, Agent, or Firm—Polster, Polster and Lucchesi

[57] ABSTRACT

A safety device for a motor-cycle having an engine, a fluid coupling operatively connected to the engine, a power transmission mechanism which receives power from the fluid coupling, the transmission mechanism having at least two-stage speed changing function of low speed drive and high speed drive, and a shift indicating switch means which changes over in association with the shifting operation in the transmission mechanism to indicate the low speed drive, or high speed drive, or neutral position, wherein the improvement comprises a switching circuit provided between the shift indicating switch means and the ignition circuit, the switching circuit forwarding an output signal from it to the ignition circuit, when the shift indicating switch means is changed over to either the low speed drive range or the high speed drive range at the start of the engine, whereby the ignition circuit is rendered inoperable.

1 Claim, 2 Drawing Figures

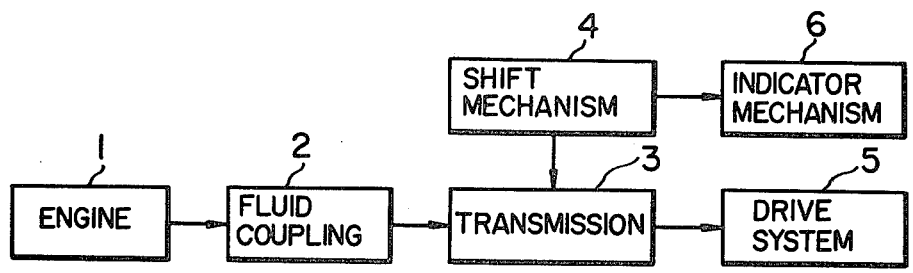
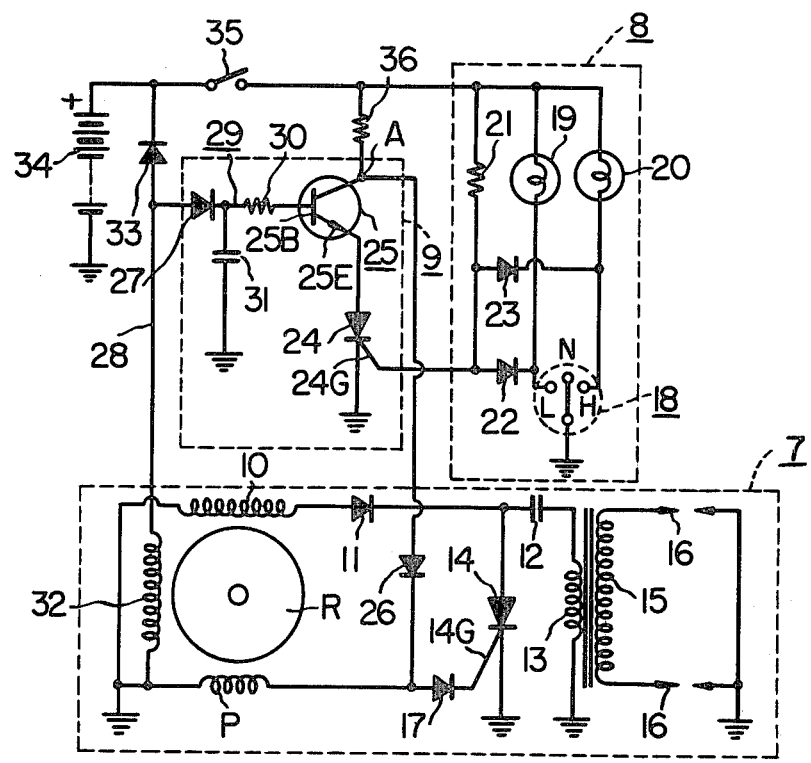

SAFETY DEVICE FOR A MOTOR-CYCLE WITH FLUID COUPLING

BACKGROUND OF THE INVENTION

This invention relates generally to a power transmission device for a motor-cycle, and, more particularly, it is concerned with a safety device for a power transmission device in a motor-cycle provided with fluid coupling.

There has already been known a motor-cycle having a fluid coupling interposed between a motor-cycle engine and its power transmission mechanism with a view to attaining smooth transmission of the driving force from the engine.

The abovementioned power transmission mechanism is in such a construction that it has at least two-stage speed changing functions of a low speed drive and a high speed drive, and that shifting between the low speed drive and the high speed drive is indicated by a shift indicating mechanism which is in an interlocked relationship with the shifting mechanism.

In the above-described construction of a motor-cycle, however, there exists such danger that, when the engine is started in a state of the power transmission mechanism being shifted to either a low speed drive or a high speed drive, the motor-cycle tends to dash abruptly.

SUMMARY OF THE INVENTION

It is therefore the primary object of the present invention to provide a safety device in the motor-cycle of the abovementioned construction, by which the engine starting is made impossible when the transmission mechanism is shifted to a low speed drive range or a high speed drive range at the time of starting the engine, thereby preventing the abovementioned danger from taking place.

According to the present invention, generally speaking, there is provided a safety device for a motor-cycle having an engine, a fluid coupling operatively connected to the engine, a power transmission mechanism which receives power from the fluid coupling, the transmission mechanism having at least two-stage speed changing function of low speed drive and high speed drive, and a shift indicating switch means which changes over in association with the shifting operation in the transmission mechanism to indicate the low speed drive, or high speed drive, or neutral position, wherein the improvement comprises a switching circuit provided between the shift indicating switch means and the ignition circuit, the switching circuit forwarding an output signal therefrom to the ignition circuit, when the shift indicating switch means is changed over to either the low speed drive range or the high speed drive range at the start of the engine, whereby the ignition circuit is rendered inoperable.

There has thus been outlined, rather broadly, the more important features of the present invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception, upon which this disclosure is based may readily be utilized as a basis for the designing of other constructions for carrying out the several purposes of the invention. It is important, therefore, that the claims be regarded as including such equivalent constructions as do not depart from the spirit and scope of the present invention.

BRIEF DESCRIPTION OF THE DRAWING

Specific embodiment of the invention has been chosen for the purposes of illustration and description, and is shown in the accompanying drawing, forming a part of the specification, in which:

FIG. 1 is a block diagram showing an interlocking relationship between the sequence of transmitting driving force from an engine and the shift indicating mechanism; and FIG. 2 is a preferred electrical circuit diagram of the safety device according to the present invention.

PREFERRED EMBODIMENT OF THE INVENTION

In the following, the present invention will be particularly described in reference to a preferred embodiment thereof as illustrated in the accompanying drawing.

FIG. 1 shows an interlocking relationship between a sequence of power transmission and a shifting mechanism, in which the driving power from an engine is transmitted to a power transmission mechanism 3 through a fluid coupling 2, which is further transmitted to a wheel driving system 5 by the shift operation in a shifting mechanism 4. On the other hand, a shift indicating mechanism 6 (including an electrical circuit therefor) is actuated in association with the shifting of the abovementioned shifting mechanism 4 to indicate a condition as shifted.

FIG. 2 indicates a connection among an ignition circuit 7 of the abovementioned engine, a shift indicating switch circuit 8, and a switching circuit 9 which sends the ignition circuit 7 a signal that renders the circuit inoperative, when the shift condition as indicated at the time of the engine start is in either a low speed drive or in a high speed drive.

The ignition circuit 7 adopts a capacitive discharge ignition system. At the primary side of this ignition system, there are provided a winding 10 which generates electricity by rotation of a rotor R of an alternating current electric power generator, a diode 11, a capacitor 12, a primary ignition coil 13, and a switching means 14 which connects and disconnects the primary side (in the illustrated embodiment, a thyrister is used), and, at the secondary side thereof, there are provided a secondary ignition coil 15 and ignition plugs 16, 16.

An ignition signal emitter P operates to emit an output signal by rotation of the rotor R of the alternating current electric power generator, the signal being sent to a gate 14G of the thyrister switching means 14 to control it for on-and-off operation.

The switching circuit 8 for the shift indication includes a switch 18 which changes over to a low speed drive range L, a high speed drive range H, or a neutral position N in association with shifting of the shift mechanism, and two lamps 19 and 20 which indicate that the switching circuit has been changed over to any of the low speed drive range, high speed drive range and neutral position.

The switching circuit 9 is constructed with a thyrister 24, the gate 24G of which is connected to the respective sides of the low speed drive range L and the high speed drive range H of the abovementioned shift indicating switch 18 through diodes 22 and 23 respectively, and the cathode side of which is earthed (E); an npn junction type transistor 25, the emitter 25E of which is connected to the anode side of the thyrister 24, and the collector 25C of which is connected to the gate 14G of the thyrister 14 through the diode 26; and an integration circuit 29, one end of which is connected to the base 25B of the transistor 25, and the other end of which is connected to a charging circuit 28 through a diode 27. Reference numerals 30 and 31 designate respectively a resistor and a capacitor of the integration circuit; 32 and 33 refer to an alternating current generating coil and a diode, respectively; 34 designates a power source; 35 refers to a main switch; and 21 and 36 designate respectively resistors.

In the above-descrived construction, when the shift indicating switch 18 closes the main switch 35 to start the engine in its state, for example, wherein the shift indicating switch 18 has been changed over to the low speed drive range L, there is formed a circuit routing the power source 34(+)→the main switch 35→the resistor 37→the diode 22→the shift indicating switch 18 (low speed drive range L)→the earth E→the power source 34(−). On account of this circuit construction, the gate 24G of the thyrister 24 in the safety circuit 9 assumes the ground potential and the thyrister 24 is maintained in a non-conductive state. Accordingly, even if the transistor 25 is rendered conductive by driving a starting motor, or with an output from the coil 32 of the alternating current electric power generator by rotation of a rotor R thereof through operation of a kick pedal, a potential at the point A is the power source voltage, since the thyrister 24 is maintained in the non-conductive state. Since the voltage at the point A is applied to the gate 14G of the thyrister 14 in the ignition circuit 7 through the thyristers 26 and 17, the thyrister 14 becomes conductive, and the ignition circuit 7 is rendered inoperative, hence the engine does not start.

The abovementioned operations are the same, even when the shift indicating switch 18 is in a state of having been changed over to a high speed drive range H.

As stated in the foregoing, according to the present invention, since the engine does not start in the state of the shift indicating switch 18 having been changed over to a low speed drive range L or a high speed drive range H, any abrupt or sudden move of the vehicle at the start of the engine, as stated in the foregoing, can be prevented to a satisfactory degree.

When the shift indicating switch 18 has already been changed over to the neutral position N, the voltage at the power source 34 is applied to the gate 24G of the thyrister 24 in the safety circuit 9, upon closure of the main switch 34. At this time, when the rotor R of the alternating current electric power generator is rotated, an output from the coil 32 is fed as an input to a base 25B of the transistor 25 through the integration circuit 29, whereby the thyrister 24 becomes conductive. On account of this, the voltage at the point A assumes a ground potential, so that no voltage is applied to the gate 14G of the thyrister 14 in the ignition circuit 7. Accordingly, the thyrister 14 becomes conductive at every time the output signal of an ignition signal emitter P is applied to the gate 14G and a high tension induction current generated in the secondary ignition coil 15 is thus fed to plugs 16, 16, whereby discharge spark is generated between gaps of the plugs 16, 16 due to electric discharge, and the engine starts. After the start of the engine, the shift indicating switch 18 changes over to the low speed drive range L or the high speed drive range H. In this case, since the thyrister 24 is maintained in the conductive state even if the gate 24G of the thyrister 24 of the switching circuit is earthed, the engine does not stop. When the vehicle stops and no output comes out of the coil 32 of the electric power generator, the transistor 25 becomes non-conductive and the thyrister 24 assumes a non-conductive state accordingly. It is also possible to utilize, in place of the thyrister 14, a semiconductor element such as transistor, and so on, or a mechanical switch. Moreover, the speed changing function of the power transmission mechanism according to the present invention may possibly be a single stage in some cases.

What is claimed is:

1. A safety device for a motor cycle, comprising in combination;
   (a) an engine;
   (b) a fluid coupling operatively connected to said engine;
   (c) a power transmission mechanism to receive driving power from said fluid coupling, said transmission mechanism having at least two-stage speed changing function of low speed drive and high speed drive;
   (d) shift indicating switch means (8) including a shift indicating switch (18) which changes over in association with shifting operation in said transmission mechanism to indicate the low speed drive, the high speed drive, or the neutral position, shift indicating lamps (19,20) to indicate change over of the switching circuit to any of the low speed drive range, high speed drive range, or neutral position, diodes (22,23), and a resistor (21);
   (e) a capacitive discharge ignition circuit (7) including, at the primary side thereof, a primary winding (10) to generate electric power by rotation of an a.x. electric power generator, a diode (11), a capacitor (12), a primary ignition winding (13), a thyrister (14) as switching means to connect and disconnect said primary side, and, at the secondary side thereof, a secondary ignition winding (15), and ignition plugs (16, 16);
   (f) a switching circuit (9) constructed with a thyrister (24), the gate (24G) of which is connected to the respective sides of said low speed drive range (L) and said high speed drive range (H) in said shift indicating switch means (18) through said respective diodes (22, 23) therefor, and the cathode side of which is grounded, an npn junction type transistor (25), the emitter (25E) of which is connected to the anode side of said thyrister (24), and the collector (25C) of which is connected to the gate (14G) of said thyrister (14) through the diode (26), and an integration circuit (29) comprising a resistor (30) and a capacitor (31), one end of which is connected to the base (25B) of the transistor (25), and the other end of which is connected to a charging circuit (28) through a diode (27).

* * * * *